(12) United States Patent
Berich et al.

(10) Patent No.: US 6,877,898 B2
(45) Date of Patent: Apr. 12, 2005

(54) EASE OF CLOSURE THROUGH TACTILE/ OPTICAL MEANS

(75) Inventors: Edward Berich, New Braunfels, TX (US); Herbert Zivkovic, Garden Ridge, TX (US)

(73) Assignee: Illinois Tool Works Inc., Glenview, IL (US)

( * ) Notice: Subject to any disclaimer, the term of this patent is extended or adjusted under 35 U.S.C. 154(b) by 37 days.

(21) Appl. No.: 10/235,151

(22) Filed: Sep. 5, 2002

(65) Prior Publication Data

US 2004/0047521 A1 Mar. 11, 2004

(51) Int. Cl.$^7$ .............................................. B65D 33/16
(52) U.S. Cl. .................................. 383/63; 24/DIG. 50
(58) Field of Search ........................... 383/208, 63, 64; 24/572.1, 399, 400, 572, 585.12, 585.11, DIG. 50

(56) References Cited

U.S. PATENT DOCUMENTS

| | | | |
|---|---|---|---|
| RE27,174 E | | 9/1971 | Ausnit |
| RE28,969 E | * | 9/1976 | Naito ........................... 383/63 |
| 4,479,244 A | | 10/1984 | Ausnit |
| 4,484,352 A | * | 11/1984 | Katzin ......................... 383/65 |
| 4,822,539 A | | 4/1989 | Tilman et al. |
| 4,929,487 A | * | 5/1990 | Tilman et al. ............... 428/163 |
| 5,209,574 A | | 5/1993 | Tilman |
| 5,211,481 A | * | 5/1993 | Tilman ......................... 383/63 |
| 5,384,942 A | | 1/1995 | Siegel |
| 5,520,463 A | * | 5/1996 | Tilman ......................... 383/63 |
| 6,074,096 A | * | 6/2000 | Tilman ......................... 383/63 |
| 6,112,374 A | * | 9/2000 | Van Erden .................... 24/400 |
| 6,154,934 A | * | 12/2000 | Matthews .................. 24/585.1 |
| 6,361,211 B1 | * | 3/2002 | Tilman ......................... 383/63 |
| 2003/0014849 A1 | * | 1/2003 | Fukumori et al. ............ 24/400 |

FOREIGN PATENT DOCUMENTS

| | | |
|---|---|---|
| GB | 2 046 660 | 11/1980 |
| JP | 0609991 A * | 4/1994 |

* cited by examiner

*Primary Examiner*—Robin A. Hylton
(74) *Attorney, Agent, or Firm*—Pitney Hardin LLP

(57) ABSTRACT

Backing areas (10, 22) are provided for a zipper (19) used in the manufacture of a reclosable bag (12). The backing areas (10, 22) are formed of a material dissimilar to the bag material with the backing areas (10, 22) provided on the walls (14, 16) of the bag (12) in alignment with the zipper (19). The material of the backing areas (10, 22) is dissimilar in that the material has physical characteristics that are noticeable to the tactile feel of the user in regard to the remaining outside areas of the reclosable bag (12). Such physical characteristics include a noticeable difference in surface lubricity, compressibility, obstructions and/or friction. These identified but not exclusive physical characteristics form the backing areas (10, 22) individually or in combination with each other.

6 Claims, 17 Drawing Sheets

EASE OF CLOSURE THROUGH TACTILE/OPTICAL MEANS

BACKGROUND OF THE INVENTION

1. Field of the Invention

The present invention relates to improvements in the manufacture of plastic bags in which a closure element is extruded from, or a zipper is attached to, the thermoplastic film used to make a reclosable bag. More specifically, the present invention relates to a method of applying or extruding an area of material on a wall of the bag opposite to and aligned with the closure element or zipper or applying the area of material to the zipper itself. This backing area of material has physical characteristics dissimilar to the material used to make the walls of the reclosable bag, thereby providing a difference in tactile feel to the user between the backing area and the remaining area of the walls of the bag.

2. Description of the Prior Art

The present invention relates to improvements in the package-making art and may be practiced in the manufacture of reclosable bags and packages of the kind that may be used for various consumer products. Such packages are often formed of a flexible plastic film and include a form of peel-seal to render the pack moisture-tight and/or airtight prior to an initial opening of the package. A zipper with interlocking profiles protects any remainder of the product therein after the initial opening. The interlocking profiles of the zipper may be integral with the package, or the interlocking profiles may be part of separate fastener strips attached to the film of the package.

In either instance, the interlocking profiles are typically interlocked during manufacture for convenience of storage and handling. However, difficulties are sometimes encountered by a user when the package is opened and closed because it is difficult to feel the interlocking profiles on the outer walls of the package.

In the prior art, the Tilman reference (U.S. Pat. No. 4,822,539) discloses the extrusion of the film and a male profile of the zipper used to make a reclosable bag. A reinforcing ridge is provided on the outer surface or outer walls of the bag film with the reinforcing ridge in alignment with the zipper. The reinforcing ridge reduces migration of the stabilizing ribs of the zipper; however, the reinforcing ridge also facilitates locating the zipper on the outer walls of the bag.

In the Ausnit reference (U.S. Pat. No. 4,479,244) the outer walls of a reclosable bag include vertical ridges as a frictional surface aligned with the closure element. The vertical ridges allow the closure element to be opened in various directions; however, the ridges also facilitate locating the closure element on the outer walls of the bag.

As described above, the prior art for locating and thereby facilitating the closure of zippers with interlocking profiles is fairly well developed but nevertheless remains open to improvements, specifically those improvements which provide alternatives to the user as well as improvements in the manufacture of reclosable bags. An improvement would be to use a material on a portion of the wall of the reclosable bag in alignment with the zipper. The material would have physical characteristics dissimilar to the film used to form the outer walls of the reclosable bag. The portion of material could be a flattened surface or in the form of the vertical ridges of the Ausnit reference, or any other protruding surfaces known to those skilled in the art.

Similar to the vertical ridges of the Ausnit reference or to the reinforcing ridge of the Tilman reference, the dissimilar material aligned with the zipper would facilitate locating the zipper by enhancing the tactile feel to the user in relation to the outer wall of the bag. Additionally, the use of dissimilar material would provide flexibility in the manufacture of reclosable bags by providing alternatives for positioning the zipper element in relation to the ease of locating the zipper by the user.

SUMMARY OF THE INVENTION

Accordingly, the present invention provides a method of producing an improved reclosable bag and the improved reclosable bag produced thereby. In the reclosable bag, continuous interlocking members of a closure element or zipper are provided along confronting faces of the bag. A backing area formed of a material dissimilar to the bag material is provided on a portion of the outer surface or outer walls of the bag in alignment with the interlocking members of the zipper. Alternatively, the backing area is provided on the zipper and is then attached to the film used to form the walls of the reclosable bag. The material of the backing area is dissimilar in that the material has physical characteristics noticeable to the user in regard to the remaining outside areas of the reclosable bag.

Such physical characteristics of the backing area include a noticeable difference in surface lubricity, thereby providing a slippery feel to the user. The backing area could be further dissimilar to the bag material by a providing a material having a compressible feel or an obstructing feel. The backing area could be still further dissimilar to the bag material by providing a material having a different shrinkage factor, thereby creating a local wrinkling effect during cooling with the result of a friction feel to the user. These identified but not exclusive physical characteristics of the backing area, individually or in combination with each other, would facilitate locating the zipper on the outer walls of the bag, thereby easing the opening and closing of the bag.

BRIEF DESCRIPTION OF THE DRAWINGS

Further objects and advantages of the present invention will become apparent from the following description and claims taken in conjunction with the accompanying drawings, in which:

DETAILED DESCRIPTION OF THE PREFERRED EMBODIMENTS

Figure 1:
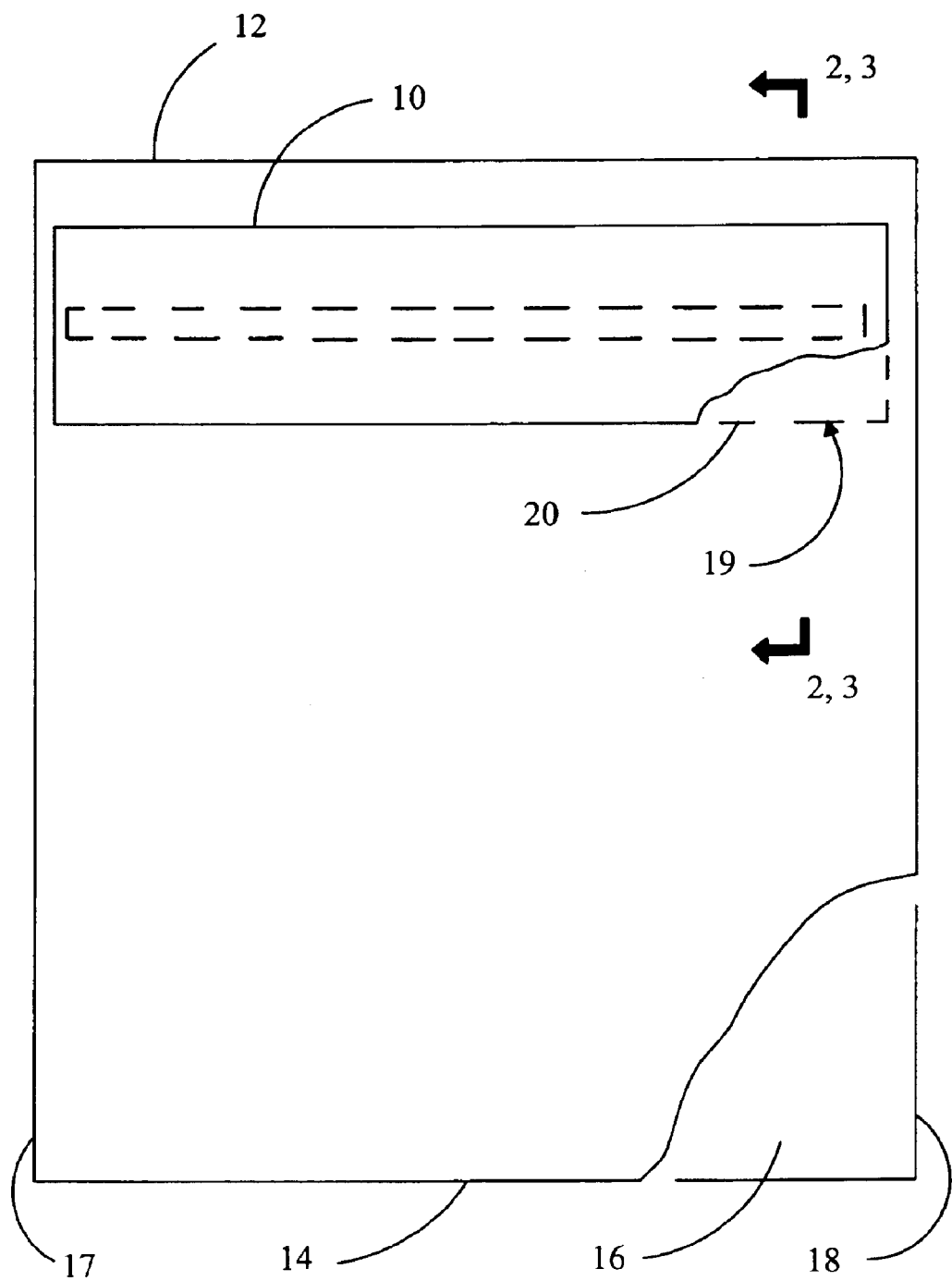
FIG. 1 is a front view of a backing area of a first embodiment of the present invention with the backing area positioned on the outer wall of a reclosable bag.

Referring now to the drawings in detail in which like numerals indicate like elements throughout the several views, a first backing area 10 of the present invention attached to a reclosable bag 12 is shown in FIG. 1. The reclosable bag 12 is formed of thin plastic film having a front wall 14 and a back wall 16 extending between two ends 17 and 18. Adjacent the top of the reclosable bag 12 is a zipper 19 with the first backing area 10 covering an area substantially the same size area as the area of profile 20 of the zipper.

Figure 2:
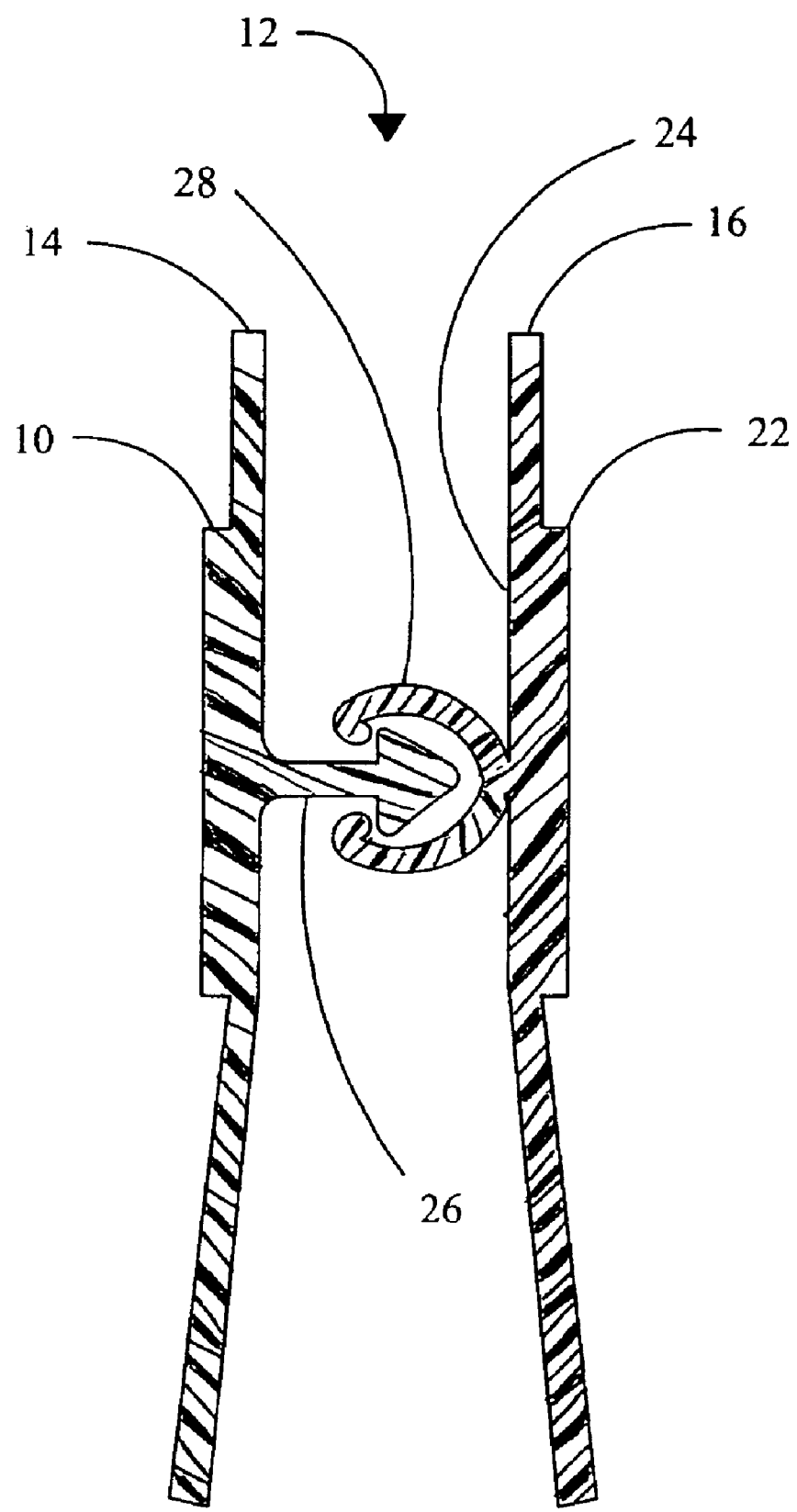
FIG. 2 is a sectional view of the backing areas of the first embodiment with the backing areas positioned relative to the interlocking male and female profiles of the zipper in which each backing area is an extruded section integrated with the film used to make a reclosable bag, with the view taken from reference line 2—2 of FIG. 1.
Figure 3:
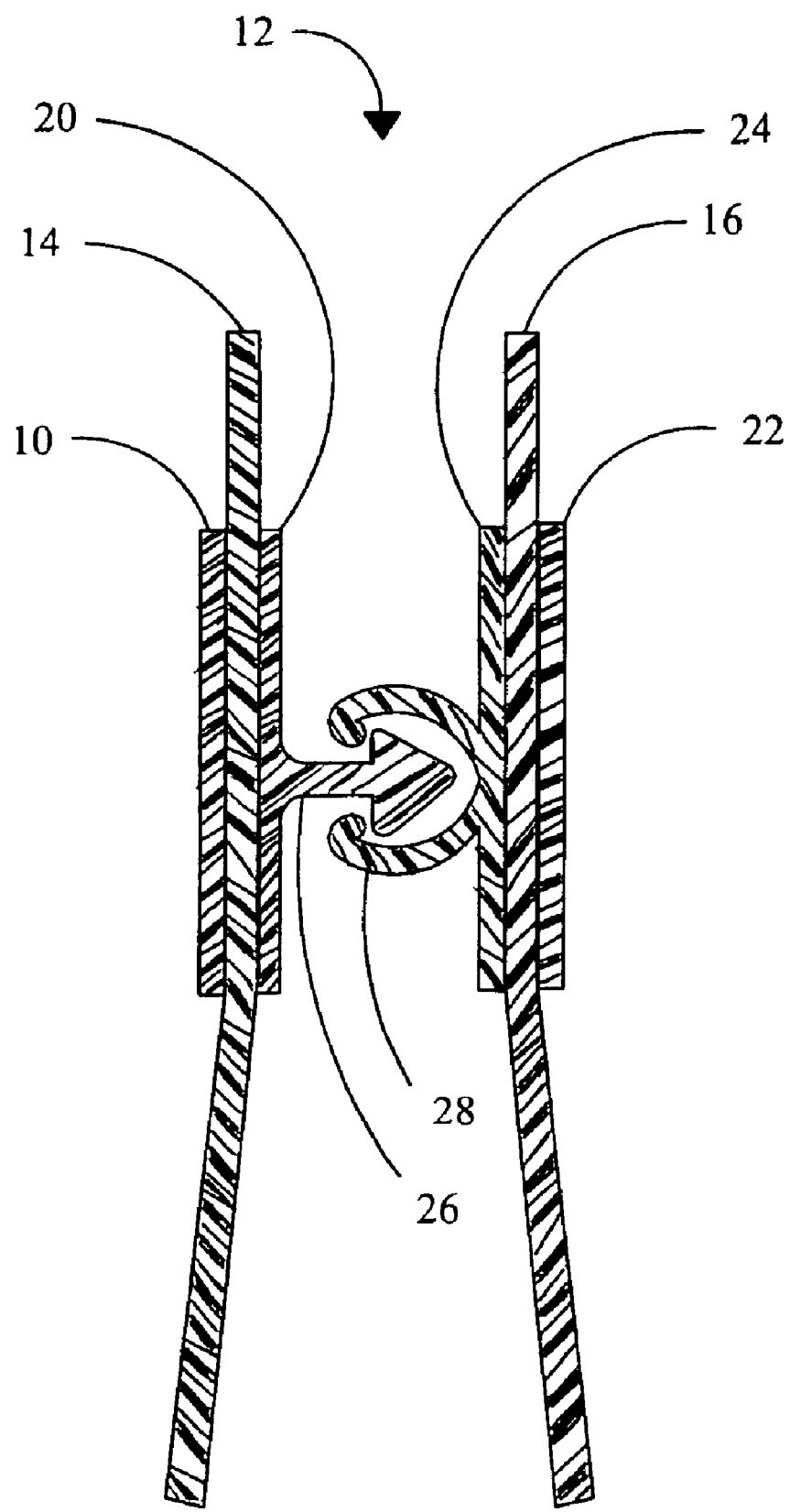
FIG. 3 is a sectional view of the backing areas of the first embodiment with the backing areas positioned relative to the interlocking male and female profiles of the zipper in which the backing areas are attached strips, with the view taken from reference line 3—3 of FIG. 1.

As shown in FIGS. 2 and 3, a second backing area 22 covers the area of profile 24 of the zipper. FIG. 2 is a sectional view of FIG. 1 in which the backing areas 10, 22 are extruded sections integrated to the film used to make the reclosable bag 12. FIG. 3 is a sectional view of FIG. 1 in which the backing areas 10, 22 are attached strips. In both figures, the backing areas 10, 22 are shown as protruding ridges to the walls 14, 16; however, the extension from the walls can be negligible if the backing areas are formed to be flush with the surface of the walls. FIGS. 7–12 depict the extrusion process for the backing areas 10, 22 for the profiles shown in FIG. 2. FIG. 13 depicts the process of attaching backing strips for the profiles shown in FIG. 3.

Figure 4:
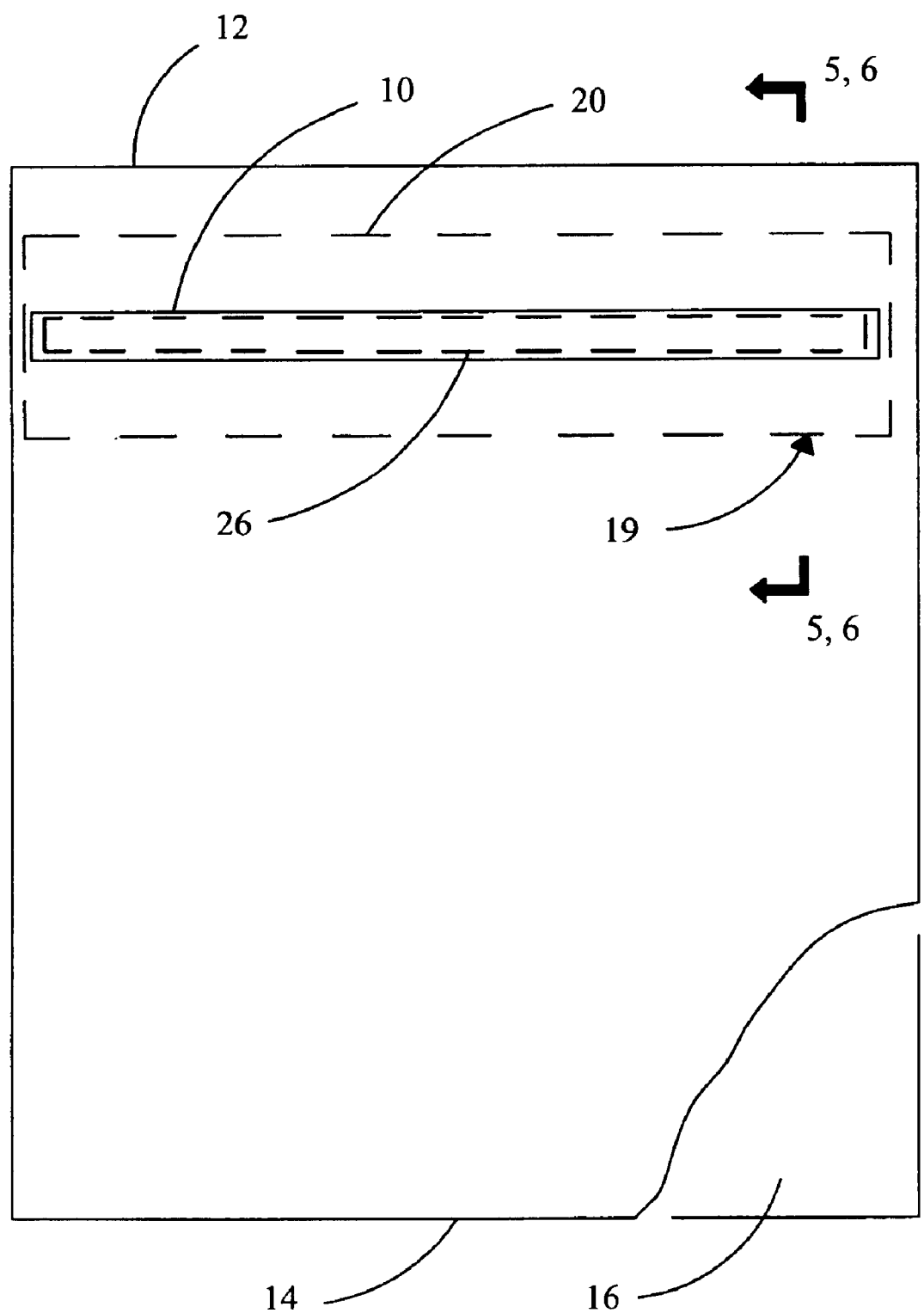
FIG. 4 is a front view of a reduced backing area of the first embodiment with the reduced backing area positioned on the outer wall of a reclosable bag.
Figure 5:
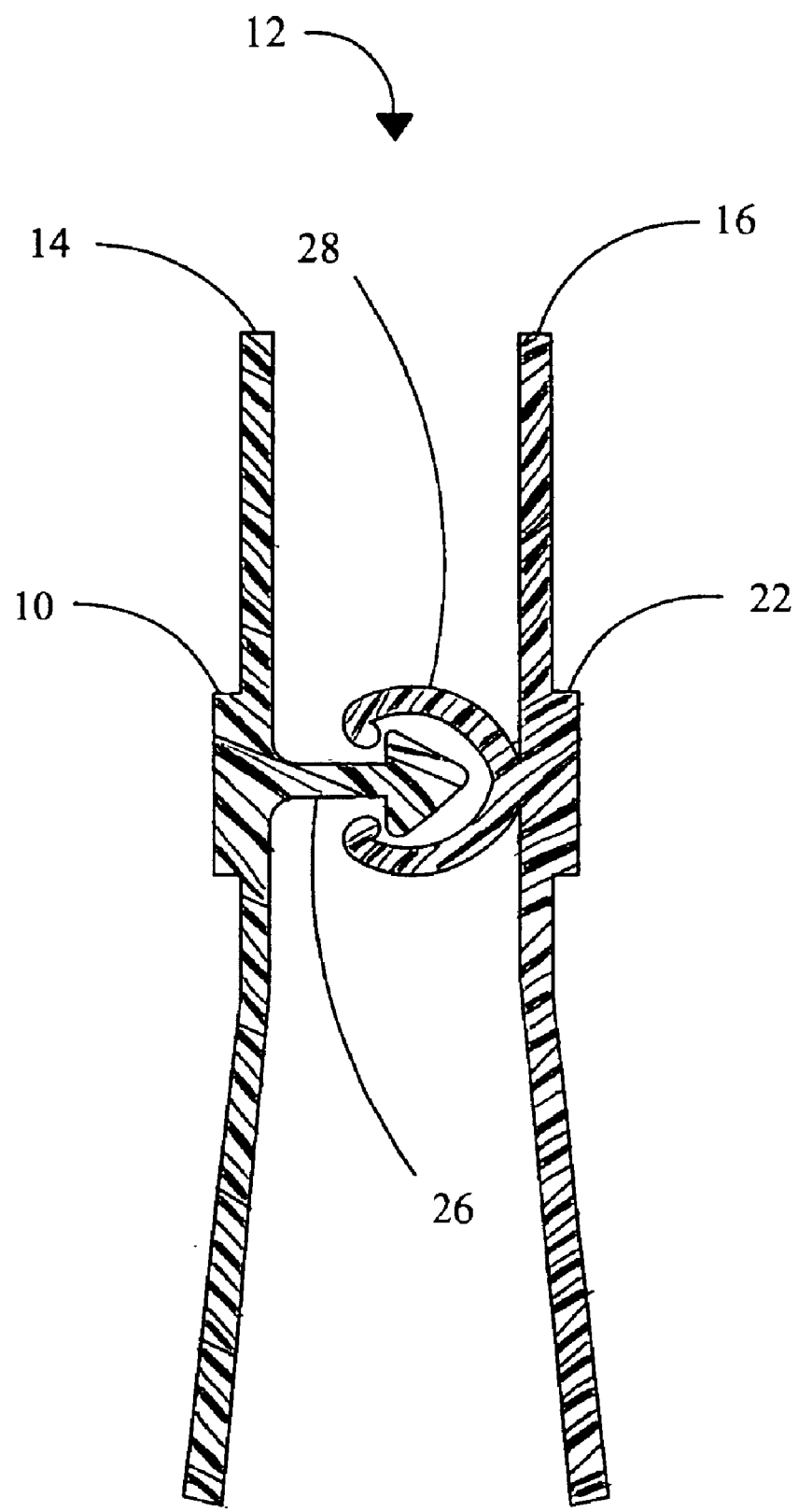
FIG. 5 is a sectional view of the reduced backing areas of the first embodiment with the reduced backing areas positioned relative to the interlocking male and female profiles of the zipper in which the reduced backing areas are extruded sections integrated with the film used to make a reclosable bag, with the view taken from reference line 5—5 of FIG. 4.
Figure 6:
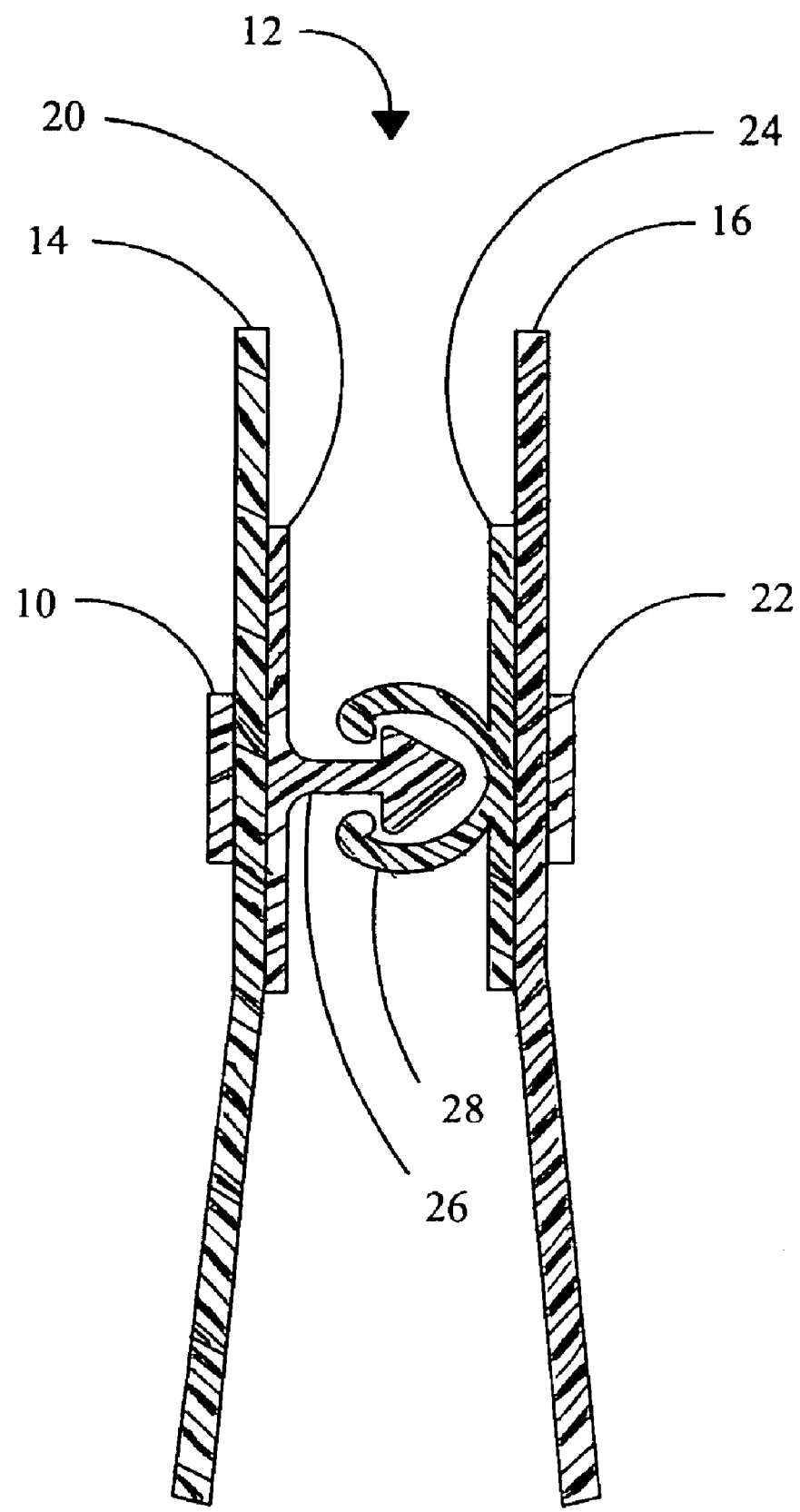
FIG. 6 is a sectional view of the reduced backing areas of the first embodiment with the reduced backing areas positioned relative to the interlocking male and female profiles of the zipper in which the reduced backing areas are attached strips, with the view taken from reference line 6—6 of FIG. 4.

Alternatively, and as shown in FIG. 4, the backing area 10 partially covers the wall 14 with enough coverage to locate an interlocking member 26 of the profile 20. As shown in FIGS. 5 and 6, the second backing area 22 partially covers the wall 16 of the zipper with enough coverage to locate an interlocking member 28 of the profile. FIG. 5 is a sectional view of FIG. 4 in which the backing areas 10, 22 are extruded sections integrated to the film used to make the reclosable bag 12. FIG. 6 is a sectional view of FIG. 4 in which the backing areas 10, 22 are attached strips. In both figures, the backing areas 10, 22 are shown as protruding ridges to the walls 14, 16; however, the extension from the walls can be negligible if the backing areas are formed to be flush with the surface of the walls. FIGS. 7–12 depict the extrusion process for the backing areas 10, 22 for the profiles shown in FIG. 5. FIG. 13 depicts the process of attaching backing strips to the profiles shown in FIG. 6.

In FIGS. 7–12, the film for the walls 14, 16 of the reclosable bag, the backing areas 10, 22 and the interlocking members 26, 28 are integrated into each other after extruding plastic through a die 30 onto a die plate 32. An extruder chamber 34 constructed for the separation of extrudate material of dissimilar physical characteristics feeds the die 30 and the die plate 32.

Figure 7:
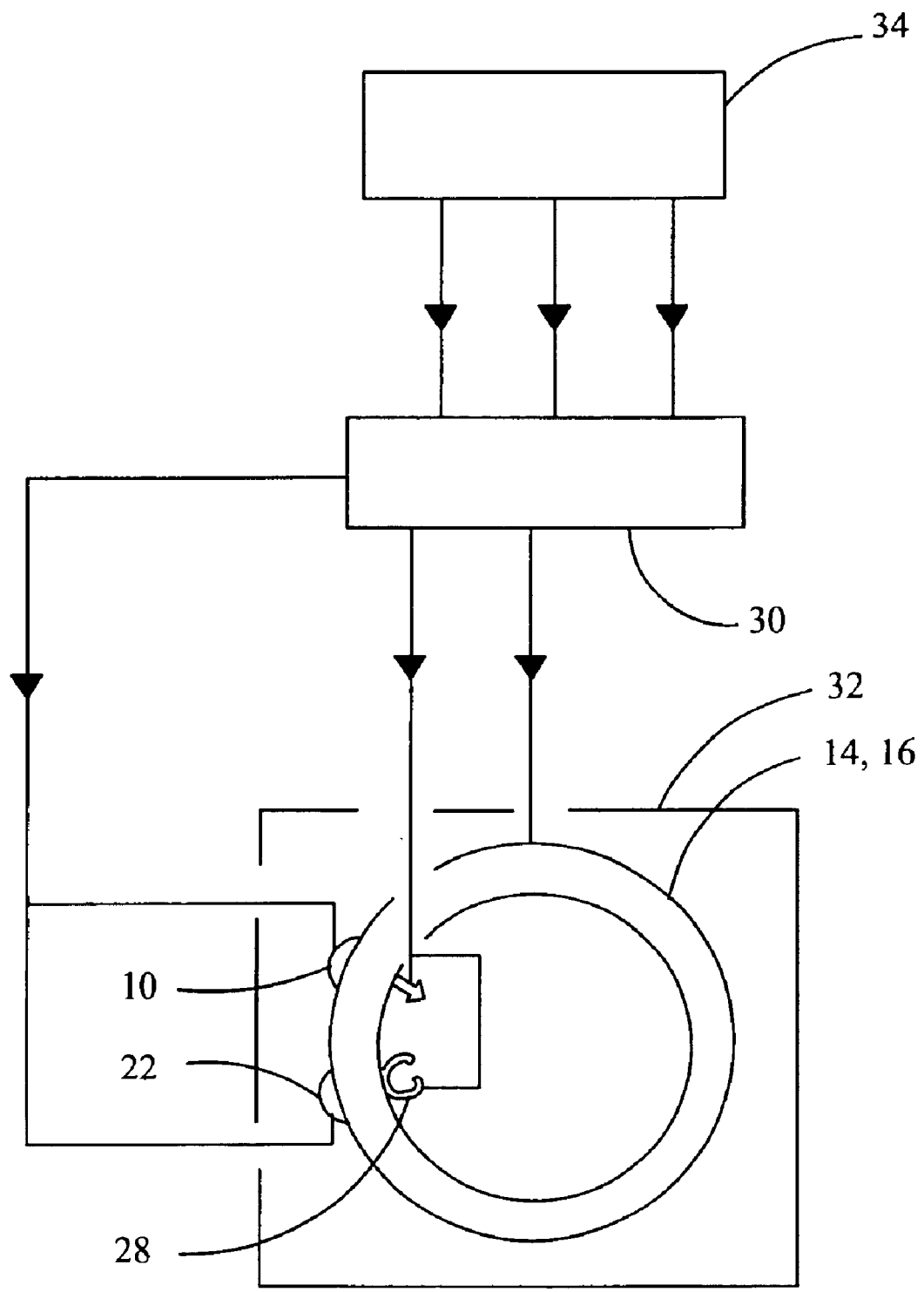
FIG. 7 is an arrangement view of the components used to form the backing areas of the present invention in which the backing areas are formed by an extrusion process with a material different from the material used to make the interlocking profiles and with the material of the backing areas also different from the material used to make the outside walls of a reclosable bag.

In FIG. 7, extrudate with a first physical characteristic is fed through a separate channel in the die 30 to form the walls 14, 16 of the bag. Extrudate with a second physical characteristic is fed through another channel in the die 30 to form the interlocking members 26, 28 of the bag. Extrudate with a third physical characteristic is fed through still another separate channel to form the backing areas 10, 22.

Figure 8:
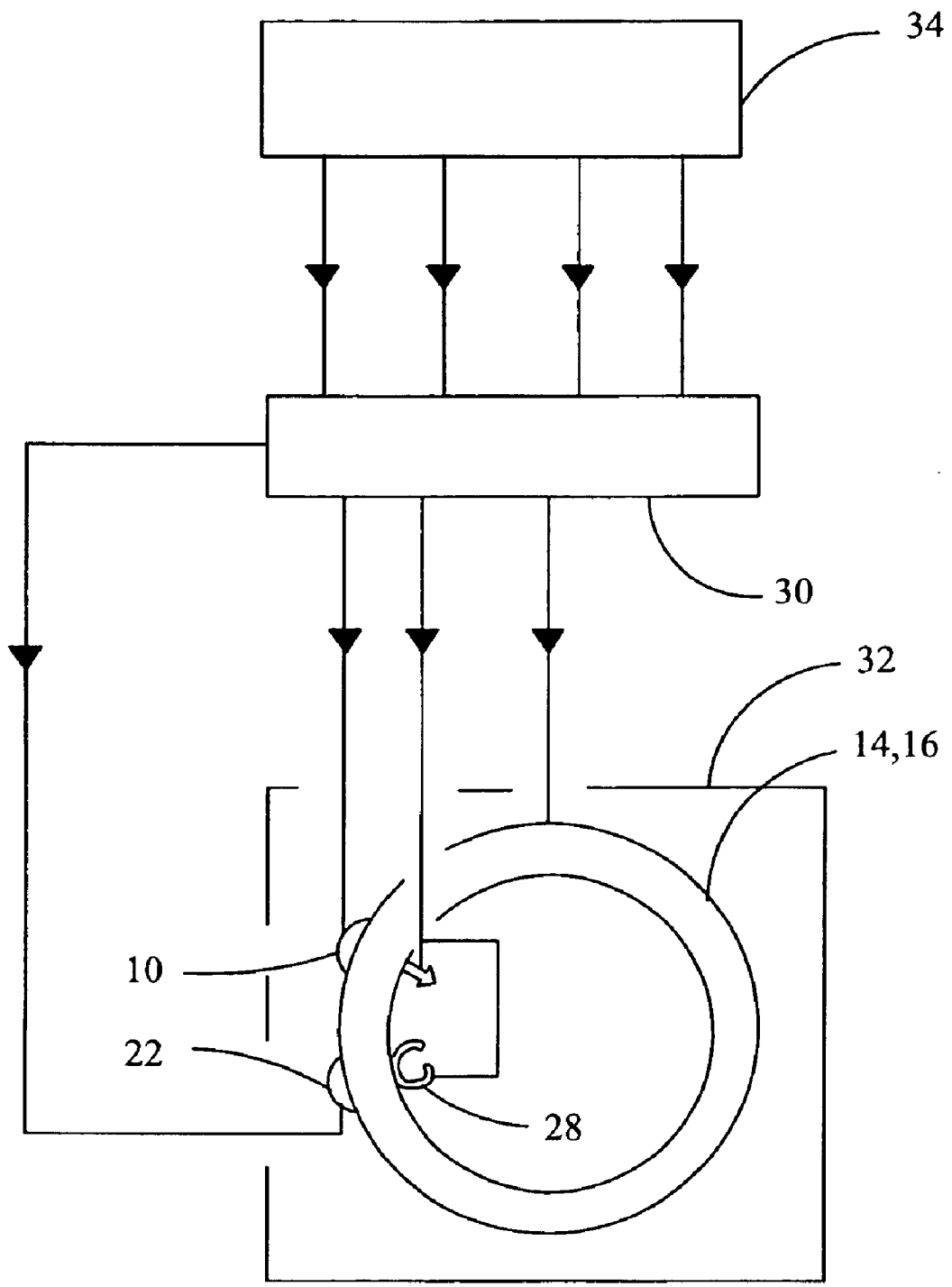
FIG. 8 is an arrangement view of the components used to form the backing areas in which the backing areas are formed by an extrusion process with a material for one backing area different from the material used to make the other backing area, the interlocking profiles and the outside walls of a reclosable bag.

As shown in FIG. 8, the extruder chamber 34 feeds the die 30 and the die plate 32. Extrudate with a first physical characteristic is fed through a separate channel in the die 30 to form the walls 14, 16 of the bag. Extrudate with a second physical characteristic is fed through another channel in the die 30 to form the interlocking members 26, 28 of the bag. Extrudate with a third physical characteristic is fed through still another separate channel to form the backing area 10, and extrudate with a fourth physical characteristic is fed through still another channel to form the backing area 22.

Figure 9:
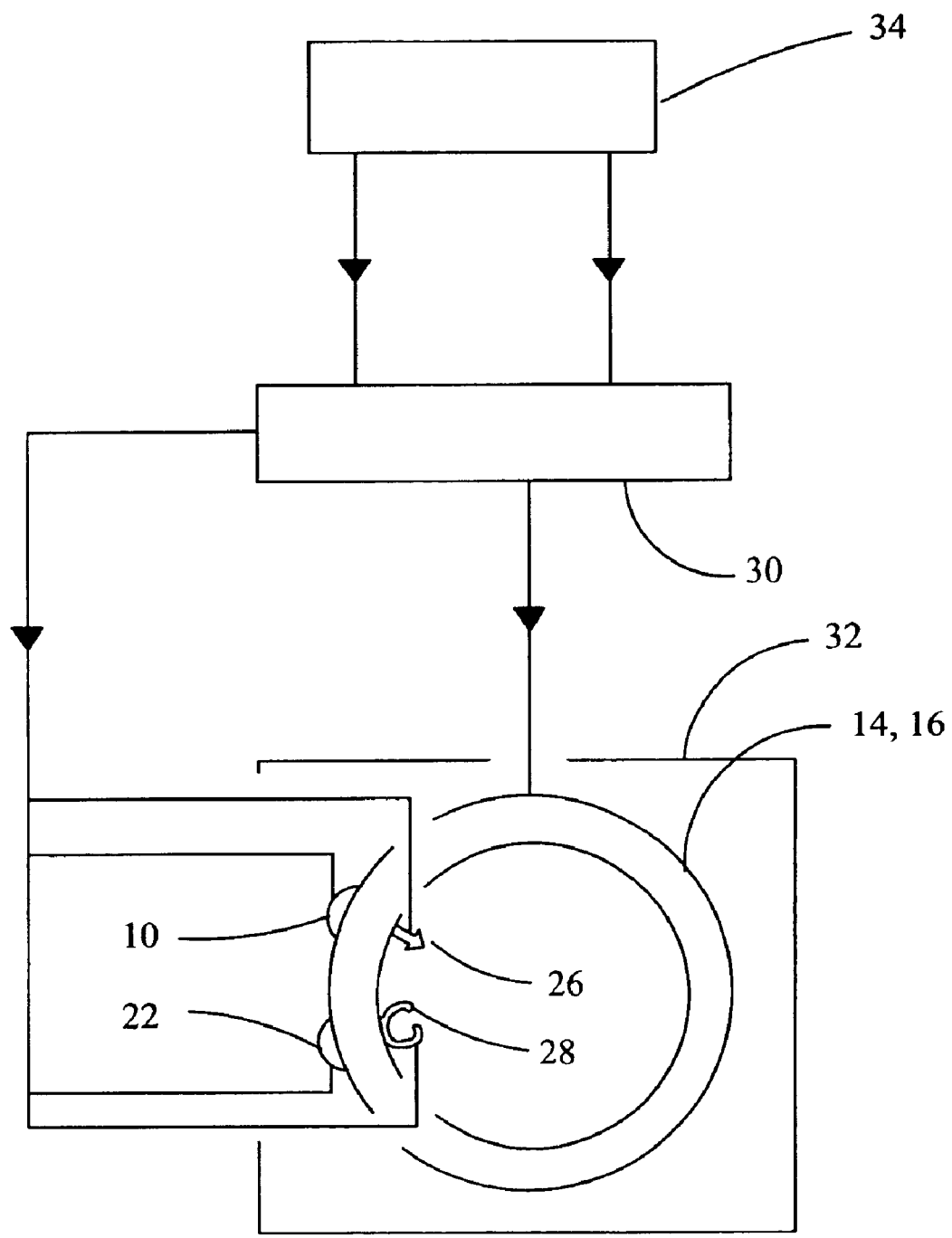
FIG. 9 is an arrangement view of the components used to form the backing areas in which the backing areas are formed by an extrusion process, with a material for the backing areas and the interlocking profiles different from the material used to make the outside walls of a reclosable bag.

As shown in FIG. 9, the extruder chamber 34 feeds the die 30 and the die plate 32. Extrudate with a first physical characteristic is fed through a separate channel in the die 30 to form the walls 14, 16 of the bag. Extrudate with a second physical characteristic is fed through another channel in the die 30 to form the interlocking members 26, 28 of the bag and the backing areas 10, 22 of the bag.

Figure 10:
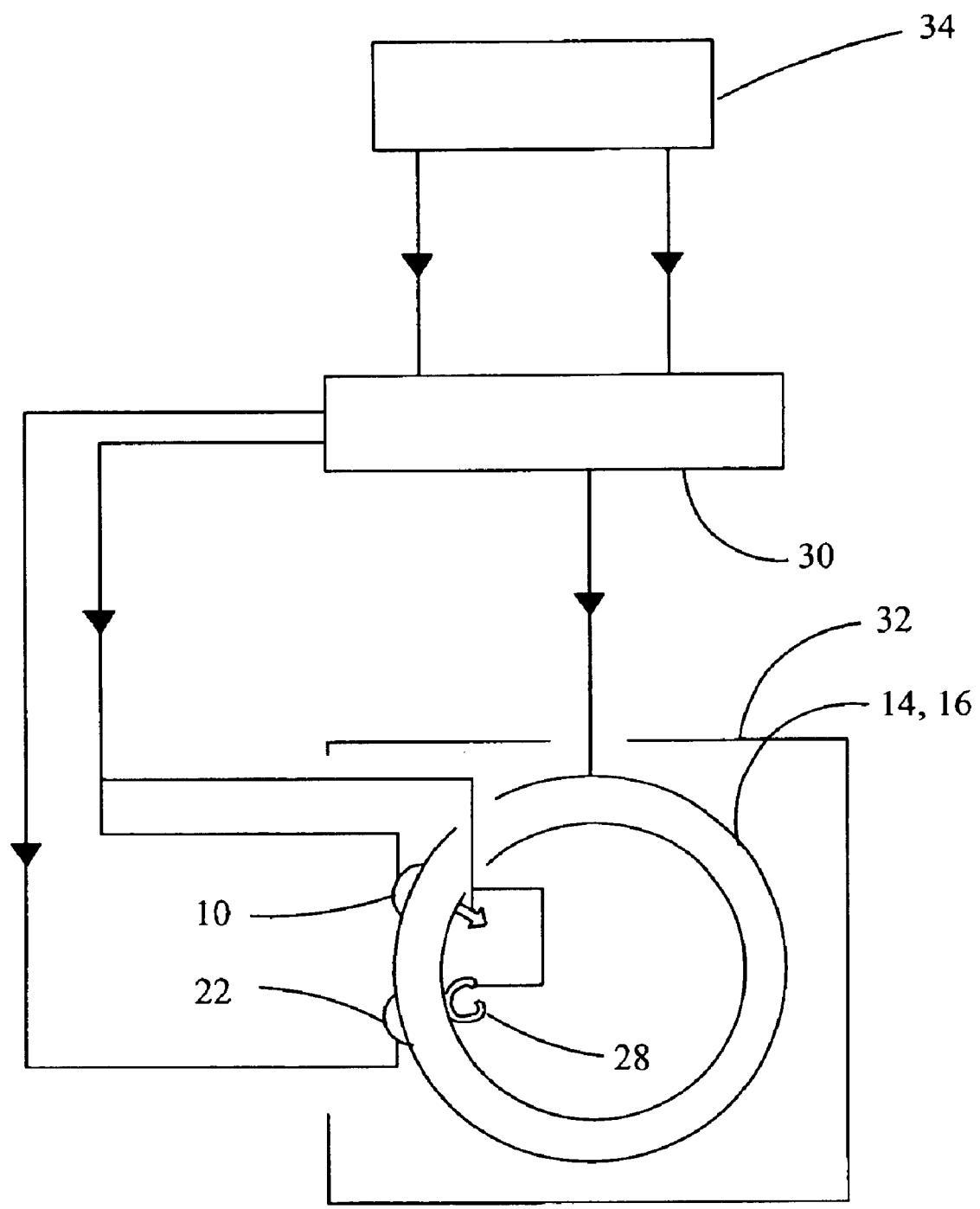
FIG. 10 is an arrangement view of the components used to form the backing areas in which the backing areas are formed by an extrusion process, with a material for one backing area different from the material used to make the other backing area and the interlocking profiles, as well as being different from the material used to make the outside walls of a reclosable bag.

As shown in FIG. 10, the extruder chamber 34 feeds the die 30 and the die plate 32. Extrudate with a first physical characteristic is fed through a separate channel in the die 30 to form the walls 14, 16 of the bag. Extrudate with a second physical characteristic is fed through another channel in the die 30 to form the interlocking members 26, 28 of the bag and the backing area 10 of the bag. Extrudate with a third physical characteristic is fed through still another channel in the die 30 to form the backing area 22 of the bag.

Figure 11:
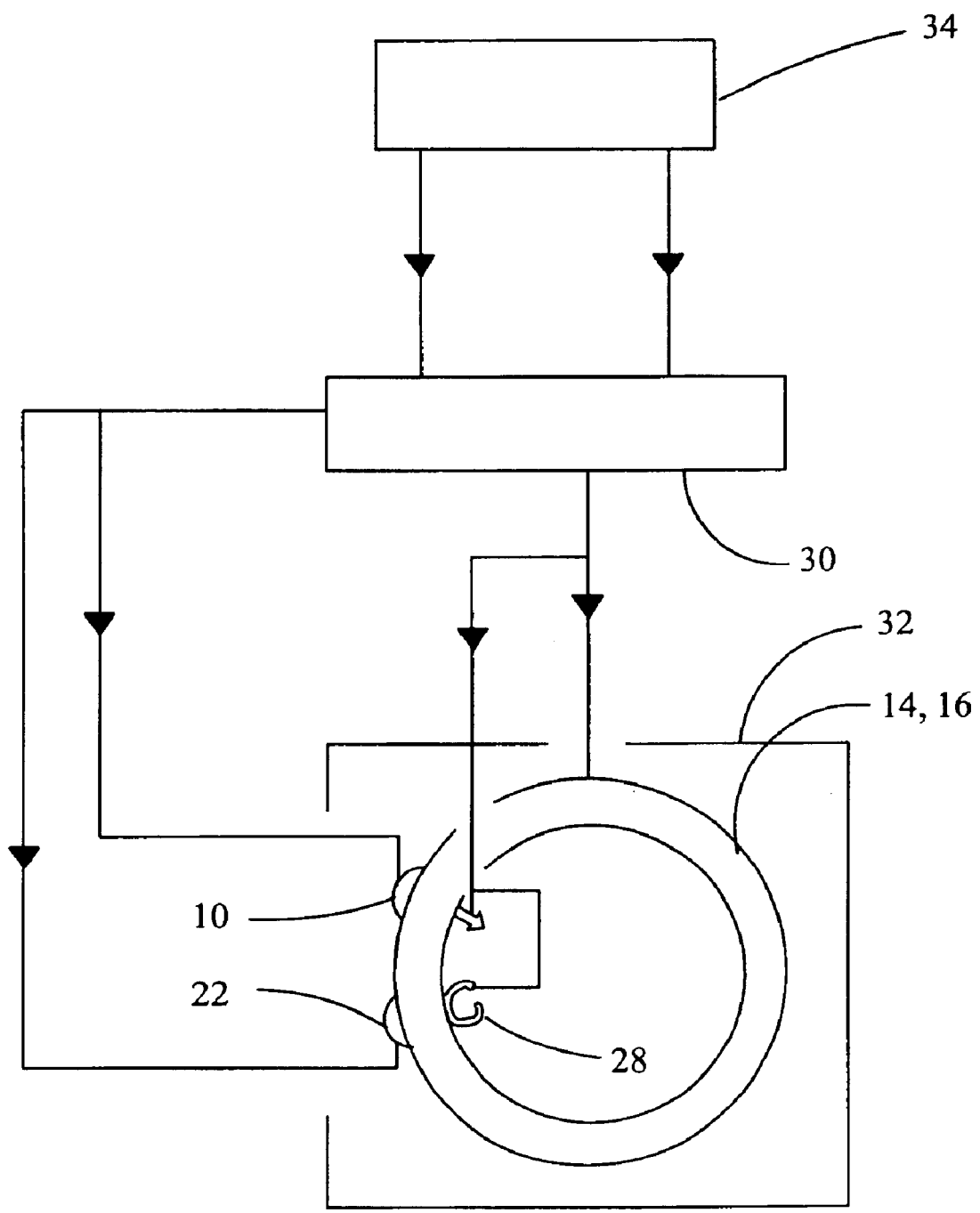
FIG. 11 is an arrangement view of the components used to form the backing areas in which the backing areas are formed by an extrusion process, with the material for the backing areas different from the material used to make the interlocking profiles and the outside walls of a reclosable bag.

As shown in FIG. 11, the extruder chamber 34 feeds the die 30 and the die plate 32. Extrudate with a first physical characteristic is fed through a separate channel in the die 30 to form the walls 14, 16 of the bag and the interlocking members 26, 28. Extrudate with a second physical characteristic is fed through still another channel in the die 30 to form the backing areas 10, 22 of the bag.

Figure 12:
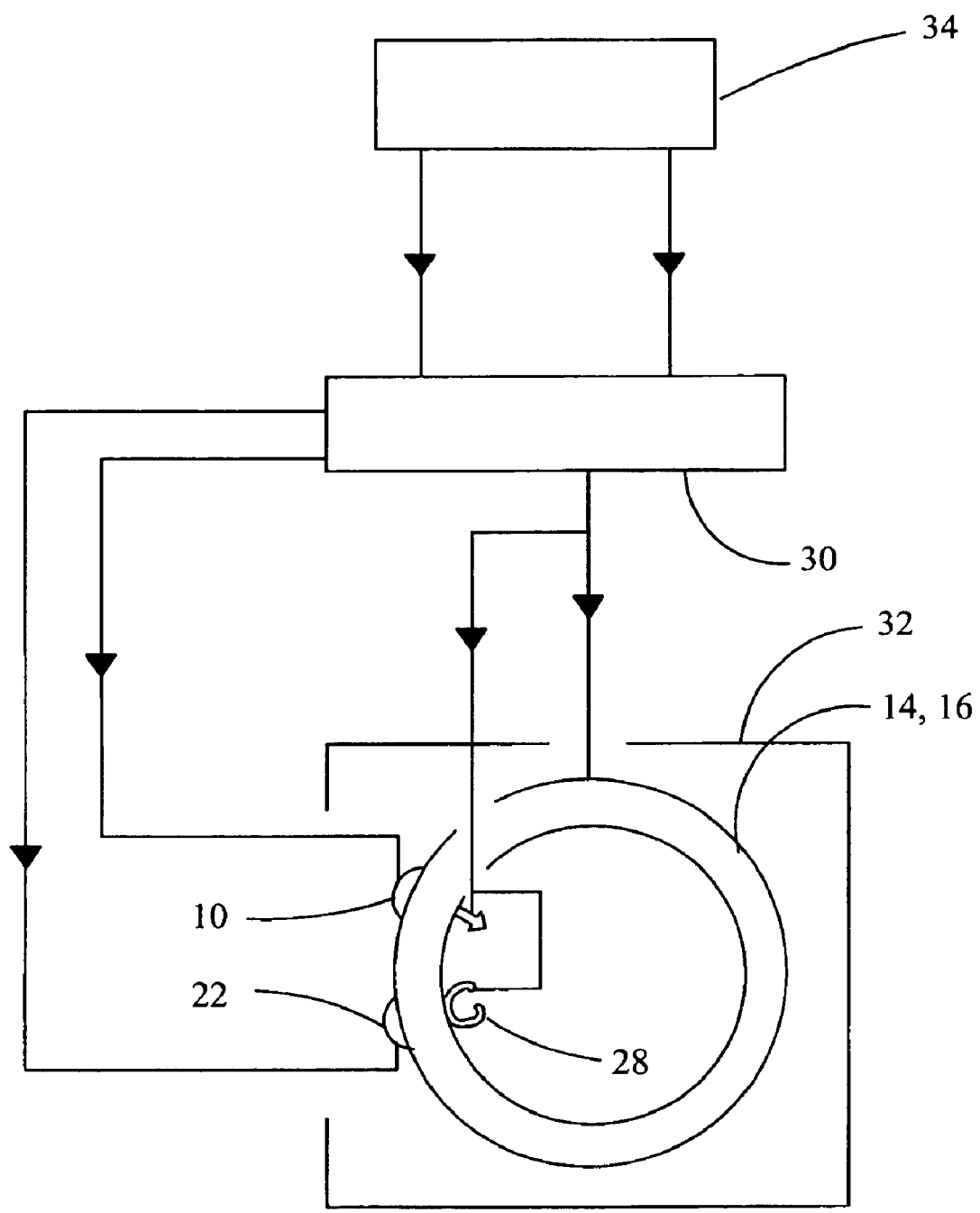
FIG. 12 is an arrangement view of the components used to form the backing areas in which the backing areas are formed by an extrusion process, with the material for the backing areas different from the material used to make the interlocking profiles and the outside walls of a reclosable bag with the material for one backing area different from the material used to make the other backing area.
Figure 13:
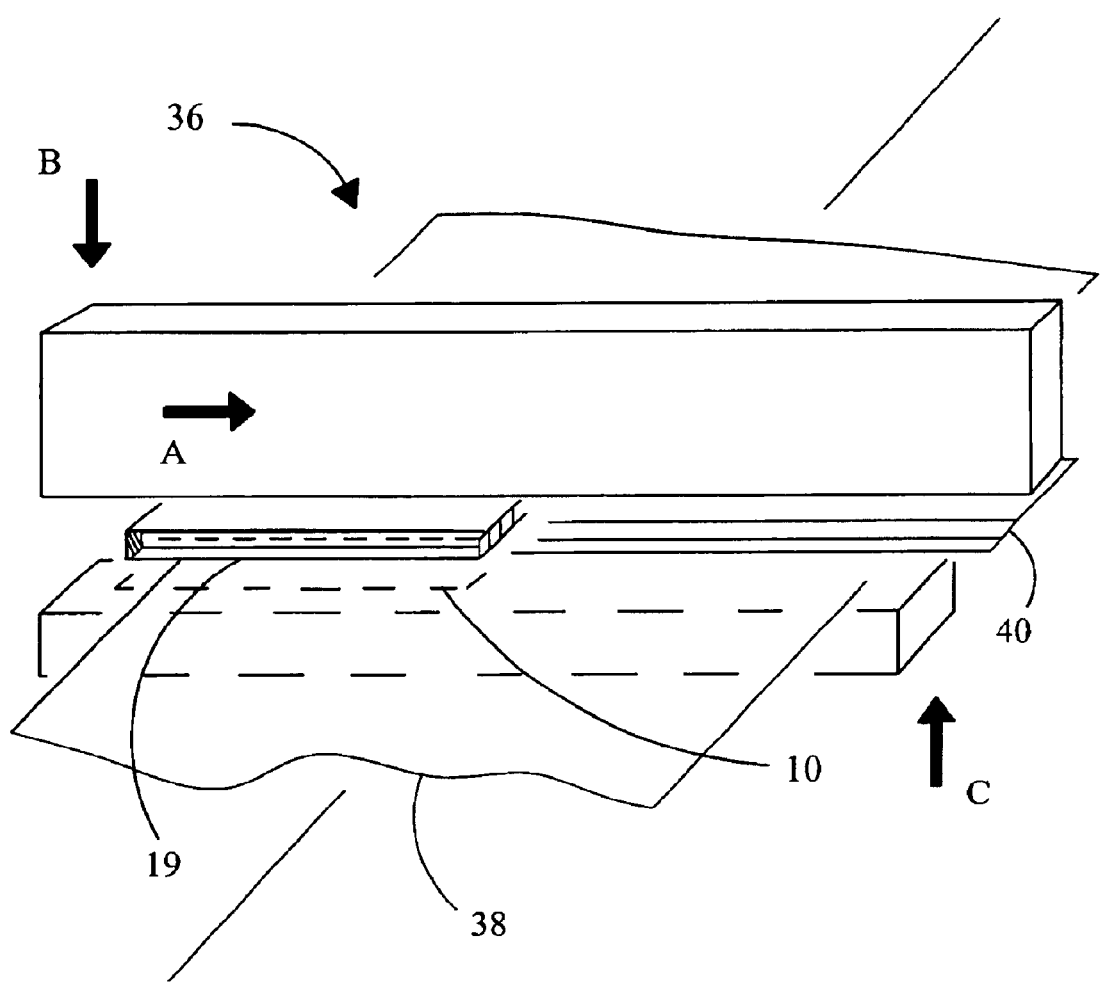
FIG. 13 is a perspective view of the backing area of the present invention in which the backing area is a strip attached to the film used to manufacture a reclosable bag.

As shown in FIG. 12, the extruder chamber 34 feeds the die 30 and the die plate 32. Extrudate with a first physical characteristic is fed through a separate channel in the die 30 to form the walls 14, 16 of the bag and the interlocking members 26, 28. Extrudate with a second physical characteristic is fed through still another channel in the die 30 to form the backing area 10 of the bag. Extrudate with a third physical characteristic is fed through still another channel in the die 30 to form the backing area 22 of the bag.

The material fed to form the backing areas 10, 22 has a different melt index than the material fed to form the walls 14, 16. By having a different melt index, the shrinkage factor of the backing areas 10, 22 vary during cooling, thereby producing a different coefficient of friction than the material of the walls 14, 16. As such, the backing areas 10, 22 have frictional qualities distinguishable to the user of the reclosable bag 12.

A further distinguishing physical characteristic of the material fed to the backing areas 10, 22 that could be used alternatively or in combination with the other distinguishing characteristics described is that the material has a higher degree of lubricity than the material fed to form the walls 14, 16. A high degree of surface lubricity results in a slippery feel to the user when compared to the material of the walls 14, 16.

A still further distinguishing physical characteristic of the material fed to the backing areas 10, 22 that could be used alternatively or in combination with the other distinguishing characteristics described is that the material has a different degree of rigidity than the material fed to form the bag walls. If the material of backing areas 10, 22 has a higher rigidity, the backing areas will obstruct the tactile feel of the user in comparison to the bag walls. If the backing areas 10, 22 have a lower rigidity, the backing area will compress to the tactile feel to the user in comparison to the bag walls.

FIG. 13 depicts an alternative form of providing a backing area to the film used to manufacture the reclosable bag 12. In the figure, the backing area 10 and the zipper 19 are advanced to a zipper applicator 36 in movement direction "A". The zipper 19 and the backing area 10 comprise strips cut at a predetermined length from separate supplies of each. The strips used for the backing area 10 and 22 comprise the individual or combined materials as previously described for the extrusion methods of FIGS. 7–12.

The cut zipper 19 and the cut backing area 10 are transversely fed to the thermoplastic film 38 used to make the reclosable bag 12; however, the zipper and the backing area may be fed to the film in other directions known to those skilled in the art. Once positioned by a zipper guide 40, the zipper 19 is sealed to the film 38 in movement direction "B". The backing area 10 is sealed on an opposite side of the film 38 from the zipper 19 in movement direction "C", with the backing area 10 in alignment with the zipper. The backing area 22 in the form of a strip may be fed and sealed to the film 38 by a similar method or by alternative methods known to those skilled in the art.

Figure 14:
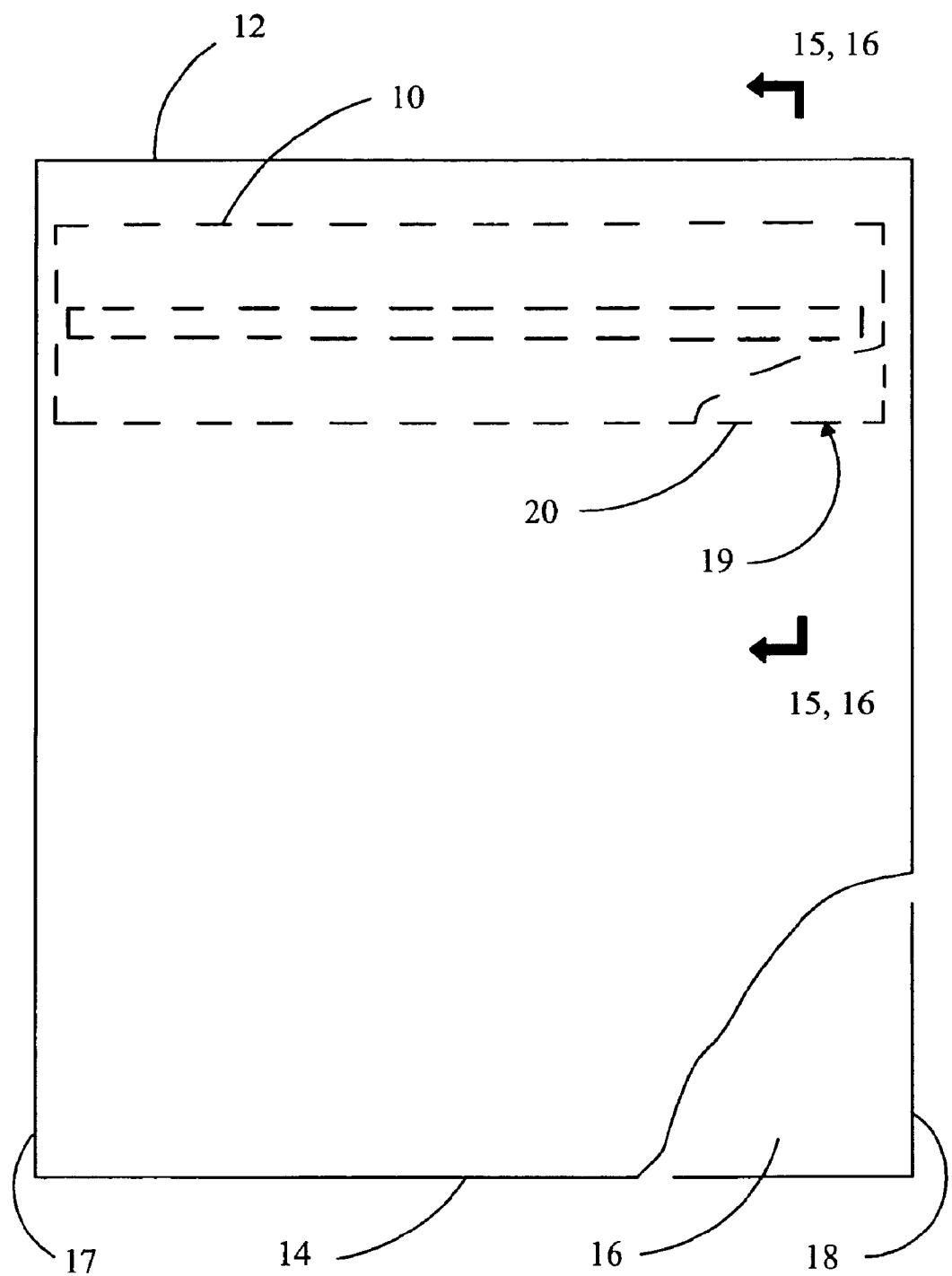
FIG. 14 is a front view of a backing area in a second embodiment of the present invention with the backing area positioned on a profile of the zipper and attached to the wall used to manufacture the reclosable bag.
Figure 15:
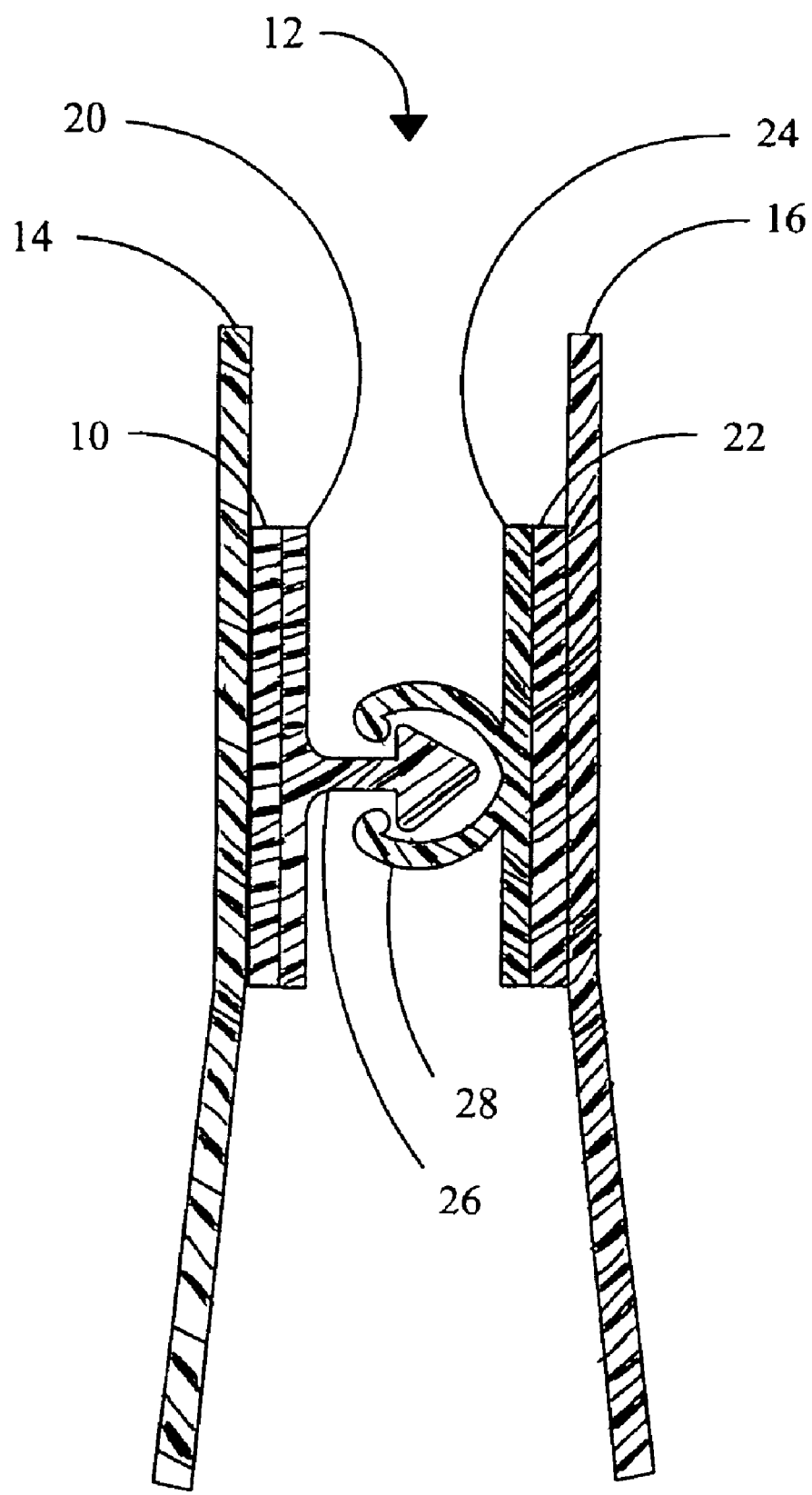
FIG. 15 is a sectional view of the backing areas of the second embodiment of the present invention, with the view taken from reference line 15—15 of FIG. 14.
Figure 16:
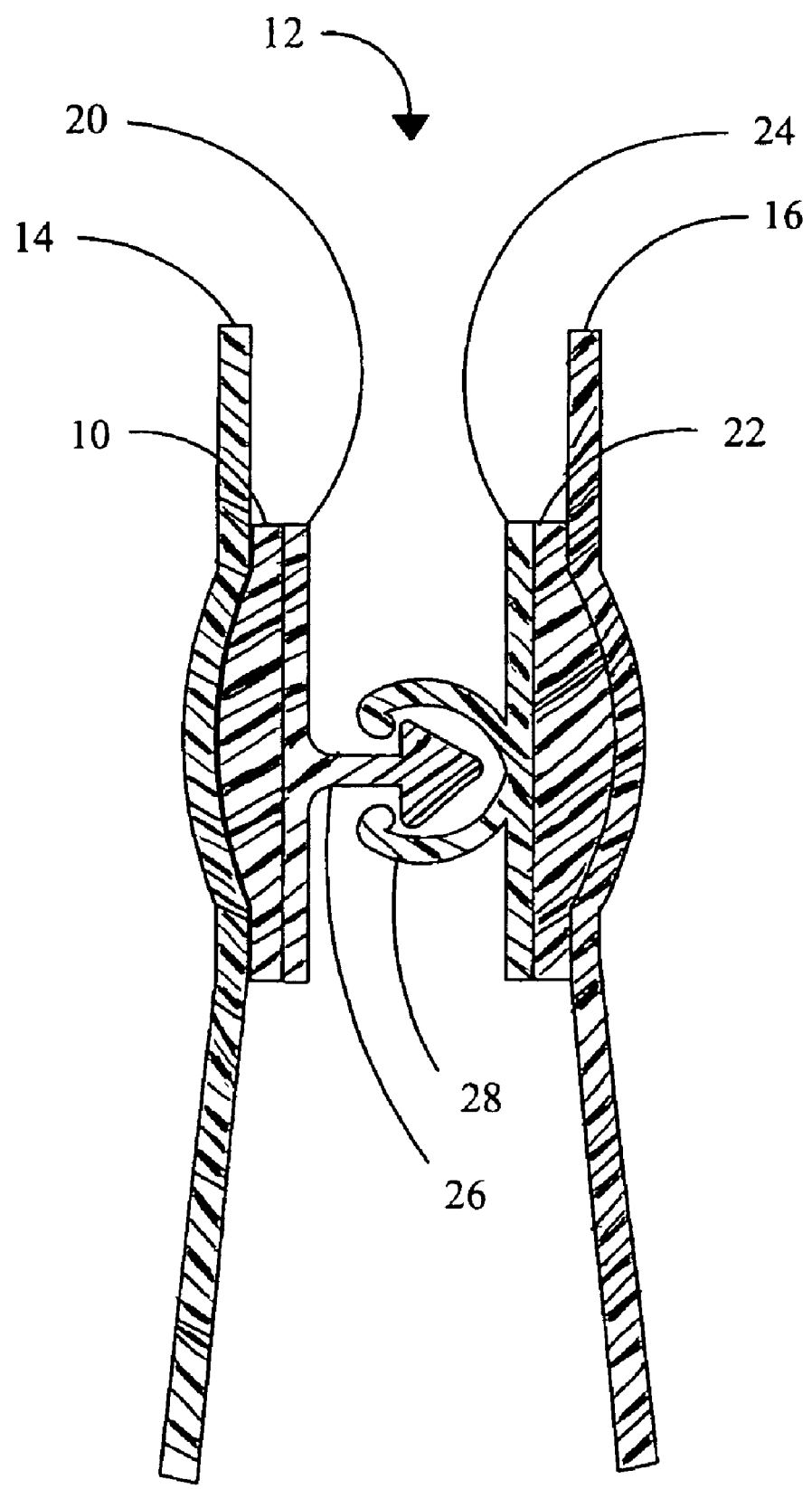
FIG. 16 is a sectional view of the backing areas of the second embodiment of the present invention in which the backing areas are formed with protruding ridges, with the view taken from reference line 16—16 of FIG. 14.

A second embodiment for the reclosable bag 12 is depicted in FIGS. 14, 15 and 16. In the second embodiment, the backing areas 10, 22 are positioned on the profiles 20, 24 and attached to the film used to form the walls 14, 16 of the reclosable bag. Also, as shown in FIG. 16, the backing areas 10, 22 can be formed to provide a protruding ridge relative to the walls 14, 16.

Figure 17:
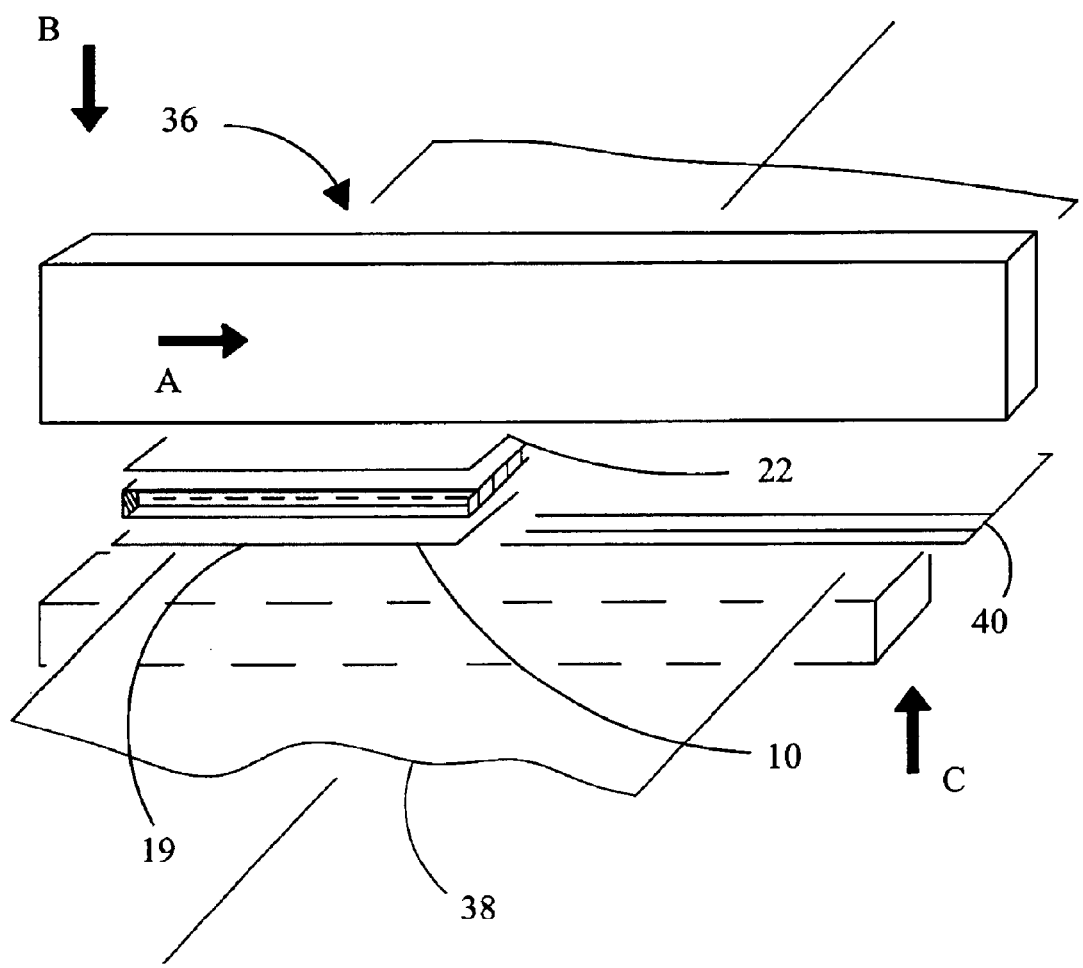
FIG. 17 is a perspective view of the backing areas of the second embodiment in which the backing areas are strips attached to the zipper and the film used to manufacture a reclosable bag.

FIG. 17 depicts a form of providing the backing area 10, 22 to the zipper 19 and the film 38 used to manufacture the reclosable bag 12 of FIGS. 14–16. In the figure, the backing areas 10, 22 and the zipper 19 are advanced to a zipper applicator 36 in movement direction "A". The zipper 19 and the backing areas 10, 22 comprise strips cut at a predetermined length from separate supplies of each. The strips used for the backing areas 10, 22 comprise the individual or combined materials as previously described for the extrusion methods of FIGS. 7–13.

The cut zipper 19 and the cut backing areas 10, 22 are transversely fed to the thermoplastic film 38 used to make the reclosable bag 12; however, the zipper and the backing area may be fed to the film in other directions known to those skilled in the art. Once positioned at a zipper guide 40, the backing area 22 is sealed to the zipper 19 in movement direction "B". The backing area 10 is sealed on an opposite side of the zipper 19 and to the film 38 in movement direction "C". Both backing areas 10, 22 are sealed in alignment with the zipper 19. The backing areas 10, 22 in the form of a strip may be previously attached to the zipper 19 by a similar method or by alternative methods known to those skilled in the art.

Thus the several aforementioned objects and advantages of the invention are most effectively attained. Although preferred embodiments of the invention have been disclosed and described in detail herein, it should be understood that this invention is in no sense limited thereby and its scope is to be determined by that of the appended claims.

What is claimed is:

1. A reclosable bag comprising:
   a top and a bottom;
   first and second opposing walls extending between said top and bottom and two ends, said first and second opposing walls each having an interior surface and an exterior surface, said first and second opposing walls formed from a material of a first physical characteristic;
   a zipper formed from a material of a second physical characteristic, said zipper having a first profile with a first interlocking member and a second profile with a second interlocking member with said zipper extending across one of the ends between the opposing walls;
   said first profile being secured to said interior surface of said first opposing wall and said second profile being secured to said interior surface of said second opposing wall; and
   a first backing area for locating said zipper, said first backing area positioned permanently on an exterior surface of said first opposing wall in alignment with the interlocking profiles with said first backing area being substantially the same size surface area on the bag wall as one interlocking profile and with said first backing area formed from a material with a third physical characteristic.

2. The reclosable bag in accordance with claim 1 wherein said reclosable bag further includes a second backing area positioned permanently on said exterior surface of said second opposing wall in alignment with the interlocking profiles, with said second backing area being substantially the same size surface area on the bag wall as one interlocking profile and with said second backing area formed from a material with said third physical characteristic.

3. The reclosable bag in accordance with claim 1 wherein said reclosable bag further includes a second backing area positioned permanently on said second opposing wall in alignment with the interlocking profiles with said second backing area being substantially the same size surface area on the bag wall as one interlocking profile and with said second backing area formed from a material with a fourth physical characteristic.

4. The reclosable bag in accordance with claim 2 wherein the first and third physical characteristics have a varying degree of frictional surfaces in relation to each other.

5. The reclosable bag in accordance with claim 2 wherein the first and third physical characteristics have a varying degree of compressibility in relation to each other.

6. The reclosable bag in accordance with claim 2 wherein at least one backing area forms a ridge on the outside of the opposing wall to which said at least one backing area is positioned.

* * * * *